United States Patent
Lee

(10) Patent No.: US 6,291,973 B1
(45) Date of Patent: Sep. 18, 2001

(54) EXTERNAL DISCHARGING/CHARGING APPARATUS

(75) Inventor: Andy Lee, Taipei (TW)

(73) Assignee: Mitac International Corp. (TW)

( * ) Notice: Subject to any disclaimer, the term of this patent is extended or adjusted under 35 U.S.C. 154(b) by 0 days.

(21) Appl. No.: 09/495,672

(22) Filed: Feb. 1, 2000

(30) Foreign Application Priority Data

Feb. 1, 1999 (TW) .............................................. 088101488

(51) Int. Cl.⁷ ...................................................... H02J 7/00
(52) U.S. Cl. .............................................................. 320/128
(58) Field of Search ................................ 320/128, 132, 320/137, 134

(56) References Cited

U.S. PATENT DOCUMENTS

| | | | |
|---|---|---|---|
| 5,731,685 | * 3/1998 | Jones ..................... | 320/128 |
| 5,867,008 | * 2/1999 | Du et al. ............... | 320/136 |
| 5,920,180 | * 11/1999 | Kim ...................... | 320/128 |
| 5,977,749 | * 12/1997 | Kim ...................... | 320/128 |
| 6,040,683 | * 2/1999 | Mottier ................. | 320/137 |
| 6,054,841 | * 4/2000 | Sudo et al. ............ | 320/134 |
| 6,064,179 | * 5/2000 | Ito et al. ............... | 320/128 |
| 6,066,939 | * 5/2000 | Nagai et al. .......... | 320/128 |
| 6,087,807 | * 7/2000 | Sudo et al. ............ | 320/128 |
| 6,127,808 | * 10/2000 | Sudo et al. ............ | 320/134 |

* cited by examiner

Primary Examiner—Peter S. Wong
Assistant Examiner—Pia Tibbits

(57) ABSTRACT

An external discharging/charging apparatus is disclosed. Users can select the operation for directly charging the battery set, or first discharging and then charging the battery set via the external discharging/charging device. Users can directly carry out power discharging/charging to the battery set, thereby improving the accuracy of the detecting device disposed in the battery set and extending the life of the battery set.

13 Claims, 2 Drawing Sheets

EXTERNAL DISCHARGING/CHARGING APPARATUS

BACKGROUND OF THE INVENTION

1. Field of the Invention

The present invention relates in general to a charging apparatus. More specifically, it relates to an external discharging/charging apparatus for directly charging a battery set, or first discharging the battery set and then charging it.

2. Description of the Related Art

The conventional charging apparatus, used for charging a battery set of a notebook computer for example, can only directly charge the battery set. However, if the battery set is always charged without first effectively discharging the battery set, then both the efficiency and life of the battery set are reduced.

In general, a detecting IC device with a Gas-Gauge is provided in a battery set of a notebook computer for detecting the remaining power capacity (the voltage level) of the battery set. However, users get used to charging the battery set before its power capacity decreases to an appropriate level for charging. Therefore, the life of the battery set is reduced and the Gas-Gauge loses its accuracy.

SUMMARY OF THE INVENTION

Therefore, an object of the present invention is to provide an external discharging/charging apparatus with which users can select to directly charge a battery set or first discharge a battery set and then charge the battery set, according to their requirements.

The present invention achieves the above-indicated object by providing an external discharging/charging apparatus which comprises at least: a DC power-supplying device for supplying power to charge the battery set; a load; a first switch, wherein when the first switch is turned on, the battery set is charged by the DC power-supplying device; a second switch, wherein when the second switch is turned on, the battery set is discharged through the load; a switch controlling device, wherein when a voltage level sensed from the battery set is higher than a predetermined value, the switch controlling device turns on the second switch, otherwise turning on the first switch; and a charge-holding device.

Moreover, when the voltage level sensed from the battery set after discharging is lower than the predetermined value, the switch controlling device turns off the second switch and turns on the first switch, and the charge-holding device outputs a control signal to make the switch controlling device leave the first switch in a turned-on state. When the battery set is removed from the external discharging/ charging apparatus, the control signal is eliminated so that the switch-controlling device can control the first switch in response to the voltage level sensed from the battery set.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

Figure 1:
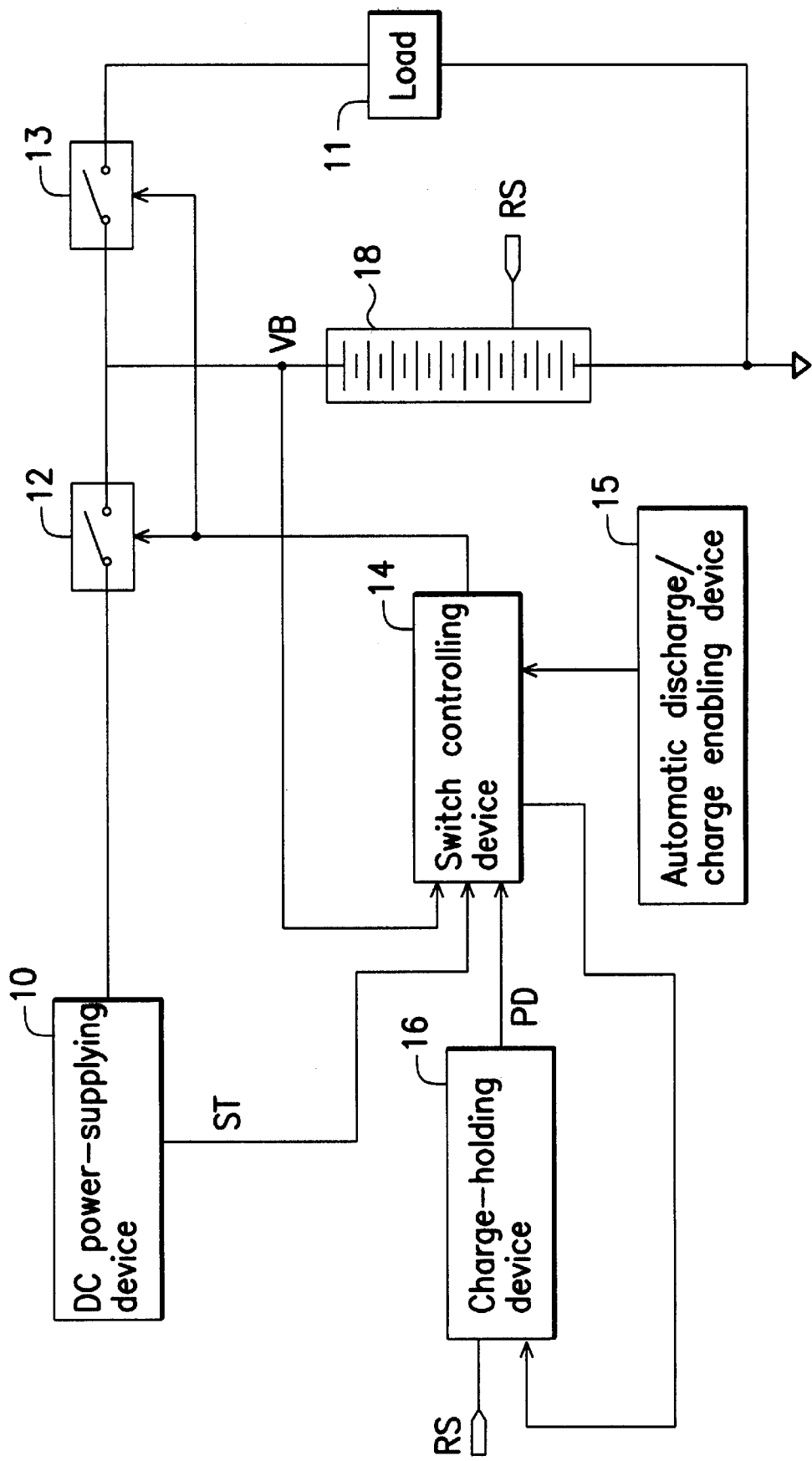
FIG. 1 schematically illustrates the circuit diagram of the external discharging/charging apparatus according to the present invention.

Referring to FIG. 1, a circuit diagram of an external discharging/charging apparatus is shown.

The structure of the external discharging/charging apparatus as depicted in FIG. 1 comprises at least: a DC power-supply device 10; a load 11; a first switch 12; a second switch 13; a switch controlling device 14; a discharge/charge enabling device 15; and a charge-holding device 16.

The DC power-supplying device 10 supplies power to charge the battery set 18. When the first switch 12 is turned on, the battery set 18 is charged by the DC power-supplying device 10. On the contrary, when the second switch 13 is turned on, the battery set 18 is discharged through the load 11.

The switch controlling device 14 compares a voltage level (VB) sensed from the battery set 18 with a predetermined value (ST). When the voltage level (VB) is higher than the predetermined value (ST), the switch-controlling device 14 turns on the second switch 13; otherwise, it turns on the first switch 12.

The discharge/charge enabling device 15 allows the users to select the operations for directly charging the battery set 18, or first discharging and then charging the battery set 18.

The charge-holding device 16 carries out the following operations. When the voltage level (VB), after discharging the battery set 18, is lower than the predetermined values (ST), the switch controlling device 14 turns off the second switch 13 and turns on the first switch 12. Then, the charge-holding device 16 outputs a control signal (PD) to make the switch controlling device 14 leave the first switch 12 in a turned-on state. When the battery set 18 is removed from the external discharging/charging apparatus, a reset signal (RS) is strobed to reset (or eliminate) the control signal PD. Therefore, the switch-controlling device 14 can control the first switch 12 in response to the comparing result of the voltage level (VB) with the predetermined value.

Figure 2:
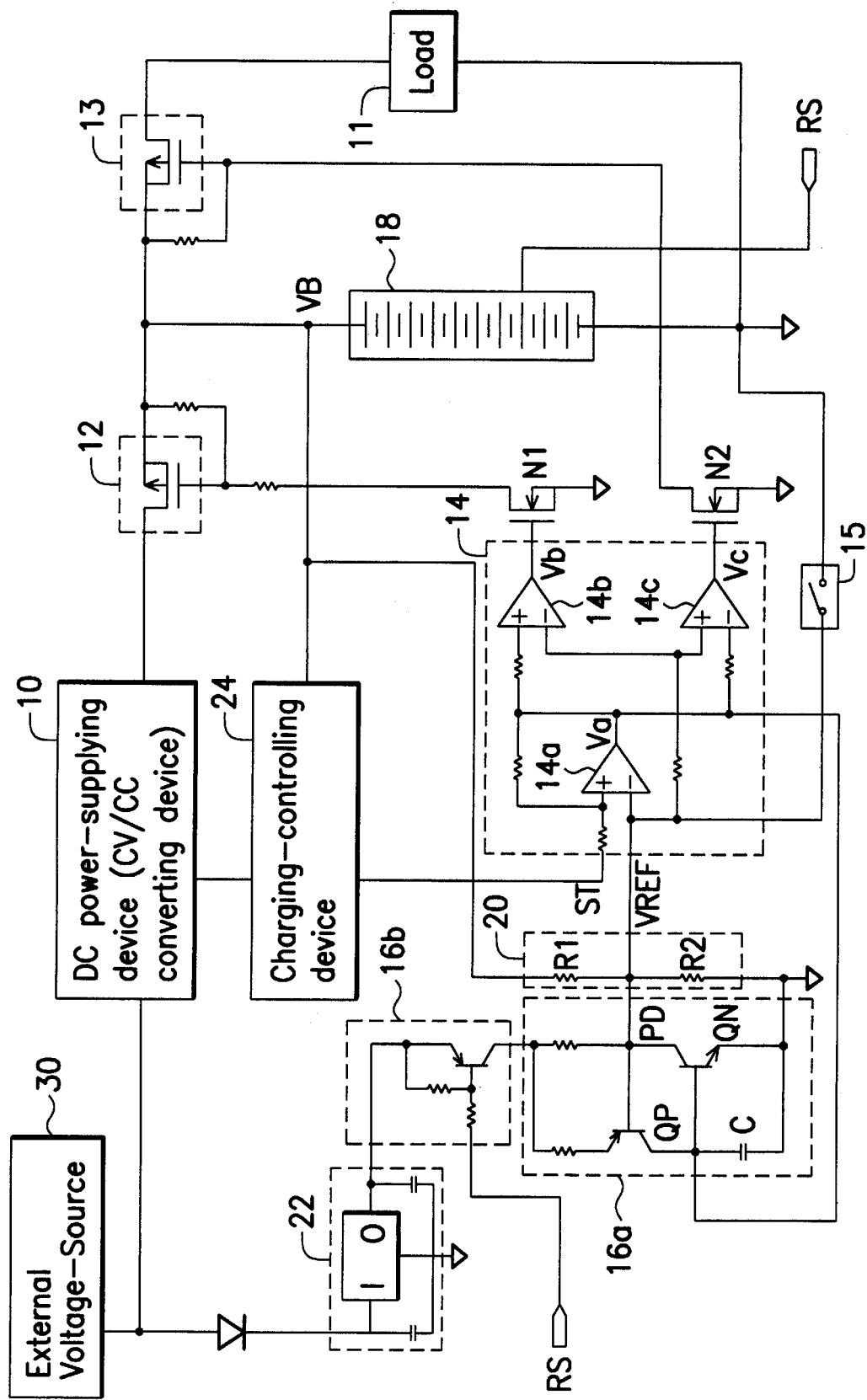
FIG. 2 illustrates one embodiment of the external discharging/charging apparatus depicted in FIG. 1.

FIG. 2 illustrates one embodiment of the external discharging/charging apparatus depicted in FIG. 1. The present invention will hereinafter be described in detail by referring to FIG. 2.

In FIG. 2, the DC power-supplying device 10 is a converting device (constant voltage/constant current converter) which receives power from an external voltage-source 30, for example 110V/220V AC power source, and converts that to a DC constant current source. At least one resistor makes up the load 11. A charge-controlling device 24 is used for detecting the temperature and voltage level of the battery set 18 and providing associated processing data such as charging and discharging alarms and reference voltages.

Both the first switch 12 and second switch 13 are PMOS transistors in this embodiment. When the PMOS transistor 12 is turned on, the DC power-supplying device 10 charges the battery set 18. When the PMOS transistors 13 is turned on, the battery set is discharged via the load 11.

In FIG. 2, a sampling device 20 comprises two resistors R1 and R2 for providing a sampling level (VREF) associated with the voltage level (VB) of the battery set 18.

In this embodiment, the switch controlling device 14 comprises a first comparator 14a for comparing the sampling level (VREF) with a predetermined value (ST); a second comparator 14b for comparing the sample level (VREF) with the output signal (Va) of the first comparator 14a; and a third comparator 14c for comparing the sampling level (VREF) with the output signal (Va) of the first comparators 14a.

The discharge/charge enabling device 15 is a selecting device, for example a selecting button in this embodiment. The discharge/charge enabling device 15 is disposed between the output of the sampling device 20 and a grounded reference. Users can choose the operation for directly charging the battery set 18 by turning on the selecting device 15; if the selecting device 15 is left off, the battery set 18 will first be discharged and then charged.

The operations for directly charging the battery set 18, or first discharging and then charging the battery set 18 are described in detail as follows.

Directly charging

Users push a selecting button for selecting to directly charge the battery set 18 by activating the selecting device 15. The selecting device 15 is turned on, thereby grounding the sampling level (VREF). The predetermined value (ST) is higher than the sampling level (VREF), therefore the output (Va) of the first comparator 14a is at a high voltage level "H". The output Va also is higher than the sampling level (VREF), therefore the output (Vb) of the second comparators (14b) is at a high voltage level "H", and the output (Vc) of the third comparators (14c) is at a low voltage level "L". Consequently, the NMOS transistor N1 depicted in FIG. 2 is turned on by the output (Vb) of the second comparator 14b, but the NMOS transistor N2 depicted in FIG. 2 is not turned on. Therefore, the PMOS transistor of the first switch 12 is turned on such that the DC power-supplying device 10 charges the battery set 18.

First discharging and then charging

Users do not push the selecting button and select to first discharge the battery set 18 before charging the battery set 18. The selecting device 15 is not turned on, and the sampling level VREF is still in proportion to the voltage level of the battery set 18.

When the sampling level (VREF) is higher than the predetermined (ST), the output (Va) of the first switch 14a is at a low voltage level "L". The output Va is also lower than the sampling level (VREF), therefore the output (Vb) of the second comparators (14b) is at a low voltage level "L", and the output (Vc) of the third comparators (14c) is at a high voltage level "H". Consequently, the NMOS transistor N2 is turned on by the output (Vc) of the third comparators 14c, but the NMOS transistor N1 is not turned on. Therefore, the PMOS transistor of the second switch 13 is turned on such that the battery set 18 is effectively discharged via the resistive load 11.

After discharging, the voltage level (VB) of the battery set 18 and the sampling level (VREF) are also lowered down. When the sampling level (VREF) is lower than the predetermined value (ST), the voltage level of the output (Va) of the first comparator 14a changes from a low voltage level "L" to a high voltage level "H". The voltage level of the outputs (Vb, and Vc) of the second and third comparators (14b, and 14c) change to a high voltage level "H" and a low voltage level "L", respectively. Consequently, the state of NMOS transistor N2 changes from an on-state to an off-state, thereby turning off the PMOS transistor of the second switch 13 to stop discharging the battery set 18. Moreover, the NMOS transistor N1 changes from an off-state to an on-state, thereby turning on the PMOS transistor of the first switch 12 and starting the operation to charge the battery set 18.

When the load 11 used to discharge the battery set 18 is removed by turning off the second switch 13, the battery set 18 is charged. However, when the load 11 is removed, the voltage level (VB) of the battery set 18 will increase suddenly, thereby raising the sampling level (VREF). If the raised sampling level (VREF) is higher than the predetermined value ST, the second switch 13 will be turned on and the battery set 18 will be discharged again. Consequently, the battery set 18 will subject to the periodical operations of discharging and charging. The battery set 18 will never be charged to a desired voltage level.

Therefore, the present invention provides a charge-holding device 16 for overcoming the above problems. In this embodiment, the charge-holding device 16 comprises a voltage pull-down device 16a; and a reset device 16b.

The output terminal of the voltage pull-down device 16a is coupled to the sampling output of the sampling device 20. The input terminal of the voltage pull-down device 16a is coupled to the output (Va) of the first comparator 14a.

When the sampling level (VREF) is lower than the predetermined value (ST) after discharging the battery set 18, the first comparator 14a outputs Va at a high voltage level "H" as an enable signal to activate the voltage pull-down device 16a. The voltage pull-down device 16a outputs a control signal (PD) to keep the sampling level (VREF) lower than the predetermined value ST. Consequently, even though the voltage level (VB) of the battery set 18 will increase suddenly when the load 11 is removed, the first switch 12 is kept at a turned-on state because the sampling level (VREF) is always lower than the predetermined value ST. The battery set 18 can be charged to a desired voltage level.

In this embodiment, the voltage pull-down device 16a is coupled to a voltage source 22 through the reset device 16b. The voltage pull-down device 16a comprises at least: a PNP transistor (QP); and a NPN transistor (QN). The collector and emitter of the PNP transistor QP are coupled to the base of the NPN transistor QN and the reset device 16b, respectively. The collector of the NPN transistor QN is coupled to the base of the PNP transistor QP and the reset device. The emitter of the NPN transistor QN is grounded, and a capacitor C is coupled between the base and emitter of the NPN transistor QN.

When the sampling level (VREF) is lower than the predetermined value (ST) after discharging the battery set 18, the first comparator 14a outputs the enable signal (that is the signal Va at a high voltage level "H") to turn on the NPN transistor QN. Because the PNP transistor QP and NPN transistor QN construct a silicon controlled rectifier (SCR) circuit structure, the control signal (PD) will be kept at a low voltage level, thereby pulling down the sampling level VREF.

When the battery set 18 is removed from the external discharging/charging apparatus, the reset device 16b eliminates (disables) the control signal PD to make the switch controlling device 14 again control the first switch 12 in response to the comparing result of the sampling level VREF with the predetermined value ST.

In this embodiment, the reset device 16b is a switching device made by a PNP transistor, and it is coupled between the voltage pull-down device 16a and the voltage source 22.

When the battery set 18 is put in the external discharging/charging device, the reset device 16b is turned on by receiving the divided voltage level (RS) of the battery set 18. Thus, the voltage source 22 can be feed to the voltage pull-down device 16a via the switch device 16b. When the battery set 18 is removed from the external discharging/charging apparatus, the reset device 16b is turned off due to lack of the divided voltage level (RS) of the battery set 18. The voltage source 22 is disconnected from the voltage pull-down device 16a, and the terminal outputting the control signal PD is floated, thereby not pulling down the sampling level (VREF).

From above descriptions, users can select the operation for directly charging the battery set, or first discharging and then charging the battery set via the external discharging/charging device according to the present invention. The accuracy of the detecting device disposed in the battery set can be improved and the life of the battery set can be extended.

While the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An external discharging/charging apparatus for directly charging a battery set, or first discharging and then charging the battery set, comprising at least:
    a DC power-supplying device for supplying power to charge the battery set;
    a load;
    a first switch, wherein when the first switch is turned on, the battery set is charged by the DC power-supplying device;
    a second switch, wherein when the second switch is turned on, the battery set is discharged through the load;
    a switch controlling device, wherein when a voltage level sensed from the battery set is higher than a predetermined value, the switch controlling device turns on the second switch, and otherwise turns on the first switch; and
    a charge-holding device, wherein when the voltage level sensed from the battery set after discharging is lower than the predetermined value, the switch controlling device turns off the second switch and turns on the first switch, and the charge-holding device outputs a control signal to make the switch controlling device leave the first switch in a turned-on state; and when the battery set is removed from the external discharging/charging apparatus, the control signal is eliminated such that the switch controlling device can control the first switch in response to the voltage level sensed from the battery set.

2. The apparatus as claimed in claim 1, wherein the switch controlling device is a comparing device for comparing the voltage level sensed from the battery set with the predetermined value, and when the voltage level sensed from the battery set is lower than the predetermined value, the switch controlling device turns on the first switch, and otherwise turns on the second switch.

3. The apparatus as claimed in claim 2, wherein the comparing device comprises: a first comparator for comparing the voltage level sensed from the battery set with the predetermined value; and a second comparator for comparing the voltage level sensed from the battery set with the output of the first comparator; and when the voltage level sensed from the battery set is lower than the output of the first comparator, the first switch is turned on, otherwise, the second switch is turned on.

4. The apparatus as claimed in claim 1, wherein the switch controlling device comprises: a first comparator for comparing the voltage level sensed from the battery set with the predetermined value; a second comparator for comparing the voltage level sensed from the battery set with the output of the first comparator; and a third comparator for comparing the output of the first comparator with the voltage level sensed from the battery set; and when the output of the first comparator is higher than the voltage level sensed from the battery set, the second comparator outputs a signal for turning on the first switch, otherwise the third comparator outputs the signal for turning on the third switch.

5. The apparatus as claimed in claim 1, wherein the charge-holding device comprises:
    a voltage pull-down device for outputting the control signal to make the first switch remain in a turned-on state when the voltage level sensed from the battery set is lower than the predetermined value; and
    a reset device for eliminating the control signal when the battery set is removed form the external discharging/charging apparatus to make the switch controlling device control the first switch in response to the voltage level sensed from the battery set.

6. The apparatus as claimed in claim 1, wherein the DC power-supply device is a converting device for receiving an external voltage-source and converting that to a DC constant current source.

7. The apparatus as claimed in claim 1, further comprising a discharge/charge enabling device for selecting the operation of directly charging the battery set, or first discharging and then charging the battery set.

8. An external discharging/charging apparatus for directly charging a battery set, or first discharging and then charging the battery set, comprising at least:
    a DC power-supplying device for supplying power to charge the battery set;
    a load;
    a first switch, wherein when the first switch is turned on, the battery set is charged by the DC power-supplying device;
    a second switch, wherein when the second switch is turned on, the battery set is discharged through the load;
    a sampling device for providing a sampling level associated with a voltage level sensed from the battery set;
    a switch controlling device which comprises:
        a first comparator for comparing the sampling level with the predetermined value;
        a second comparator for comparing the sampling level with the output of the first comparator; and
        a third comparator for comparing the output of the first comparator with the sampling level;
        wherein when the sampling level is higher than the predetermined value, the output of the first comparator is lower than the sampling level, thereby the third comparator turns on the second switch, otherwise the second comparator turns on the first switch;
    a discharge/charge enabling device for selecting the operation of directly charging the battery set or first discharging and then charging the battery set; and
    a charge-holding device, wherein when the sampling level is lower than the predetermined value, the switch controlling device turns off the second switch and turns on the first switch, and the charge-holding device outputs a control signal to make the switch controlling device leave the first switch remain in a turned-on state; and when the battery set is removed from the external discharging/charging apparatus, the control signal is eliminated such that the switch controlling device can control the first switch in response to the sampling level.

9. The apparatus as claimed in claim 8, wherein the charge-holding device comprises:
- a voltage pull-down device whose output is coupled to the sampling device and input is coupled to the output of the first comparator; and
- a reset device for eliminating the control signal when the battery set is removed form the external discharging/charging apparatus to make the switch controlling device can control the first switch in response to the voltage level sensed from the battery set;
- wherein when the sampling level is lower than the predetermined value, the first comparator outputs an enable signal to make the voltage pull-down device output the control signal such that the sampling level is pulled down and kept at the level lower than the predetermined value, thereby turning on the first switch through the switch controlling device.

10. The apparatus as claimed in claim 9, wherein the reset device is a switching device coupled between the voltage pull-down device and a power source; and when the battery set is put in the external discharging/charging device, the switching device is turned on through the divided voltage level of the battery set, and the power source is fed to the voltage pull-down device via the switch device; and when the battery set is removed form the external discharging/charging apparatus, the switch device is turned off and the power source is not fed to the voltage pull-down device, thereby eliminating the control signal outputted from the voltage pull-down device.

11. The apparatus as claimed in claim 10, wherein the voltage pull-down device comprises at least: a PNP transistor; and a NPN transistor; and the collector and emitter of the PNP transistor are coupled to the base of the NPN transistor and the reset device respectively, and the collector of the NPN transistor is coupled to the base of the PNP transistor and the reset device, and the emitter of the NPN is grounded.

12. The apparatus as claimed in claim 8, wherein the discharge/charge enabling device is a selecting device coupled between the output of the sampling device and a grounded reference; and when the operation for directly charging the battery set is chosen, the selecting device is turned on and pulls down the sampling level of the sampling device to be lower than the predetermined value, thereby turning on the first switch.

13. The apparatus as claimed in claim 8, wherein the DC power-supply device is a converting device for receiving an external voltage-source and converting that to a DC constant current source.

* * * * *